Patented Oct. 10, 1939

2,175,854

UNITED STATES PATENT OFFICE 2,175,854

METAL CLAD SWITCHGEAR

Harold H. Rugg, Wilkinsburg, Pa., assignor to Westinghouse Electric & Manufacturing Company, East Pittsburgh, Pa., a corporation of Pennsylvania Application December 17, 1937, Serial No. 180,389

8 Claims. (Cl. 175—298)

My invention relates, generally, to metal clad switchgear, and, more particularly, to metal clad switchgear of the vertical lift type in which the breaker unit is removable from the cell or housing in a horizontal phase.

An object of my invention, generally stated, is to provide a metal clad switchgear structure which shall be simple and efficient in operation and which may be readily and economically manufactured and installed.

A more specific object of my invention is to provide for so supporting a breaker unit in a housing that the unit may be inserted into and removed from the housing without the use of bolts or other fastening devices.

Another object of my invention is to provide a simplified means for raising and lowering a circuit breaker unit in a cell structure.

Other objects of the invention will be explained fully hereinafter or will be apparent to those skilled in the art.

In accordance with one embodiment of the invention the breaker unit is raised and lowered in a vertical plane by four motor driven screws, one of which is located at each corner of the housing. The rear end of the breaker frame is supported by a cross bar that is disposed between the two rear screws and raised and lowered by nuts on these screws. Individual nuts on the front screws engage supports on the breaker frame which are open at the rear to permit withdrawal of the breaker unit from the front of the housing in a horizontal plane without removing any bolts or other fastening devices.

For a fuller understanding of the nature and objects of the invention, reference may be had to the following detailed description, taken in conjunction with the accompanying drawings, in which.

Figure 1:
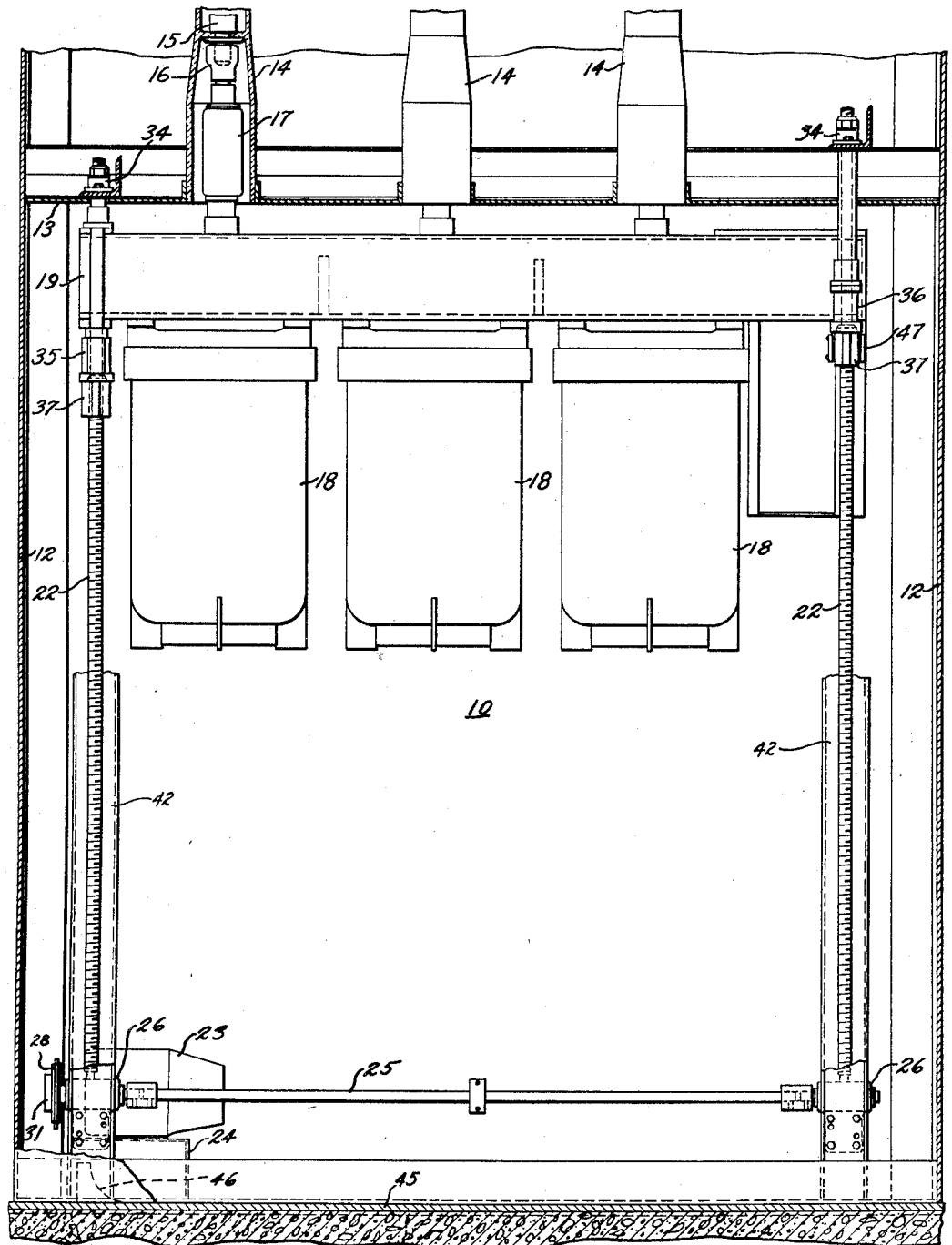
Figure 1 is a view, partially in side elevation and partially in section, of a metal clad switchgear structure embodying my invention.

Referring to the drawings, the apparatus shown comprises a steel cell structure 10 enclosed by sheet metal side walls 11, end walls 12 and a top wall 13. The structure supports insulator bushings 14 in which are mounted fixed contacts 15 which may be connected to power conductors (not shown). The contacts 15 are adapted to be engaged by disconnect contacts 16 carried by terminals 17 of oil circuit breaker housings 18, which are suspended from a framework 19 to constitute a circuit breaker unit.

In the present embodiment of the invention, the circuit breaker unit comprises three separate tanks 18 and is adapted for use in three-phase power systems. It will be understood that the structure may be readily modified to be suitable for use in single phase power systems.

Figure 2:
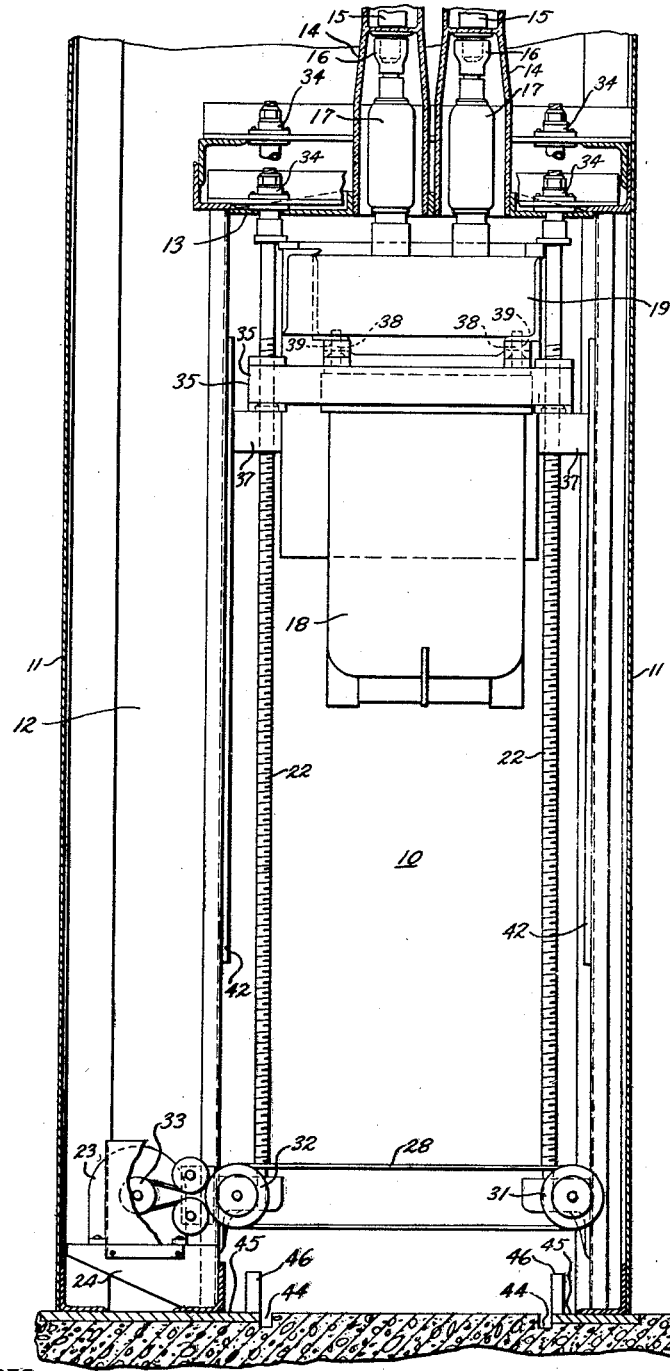
Fig. 2 is a view, partially in end elevation and partially in section of the structure shown in Fig. 1.
Figure 3:
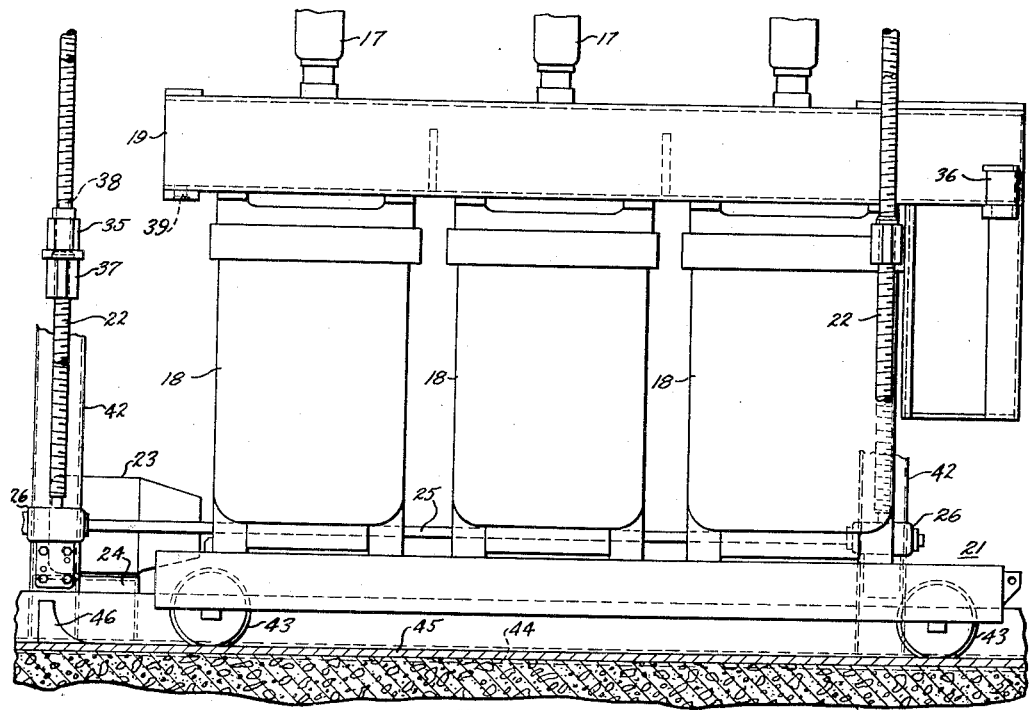
Fig. 3 is a view, in side elevation of a portion of the structure, showing the breaker unit resting on a transport truck and partially removed from the housing.
Figure 4:
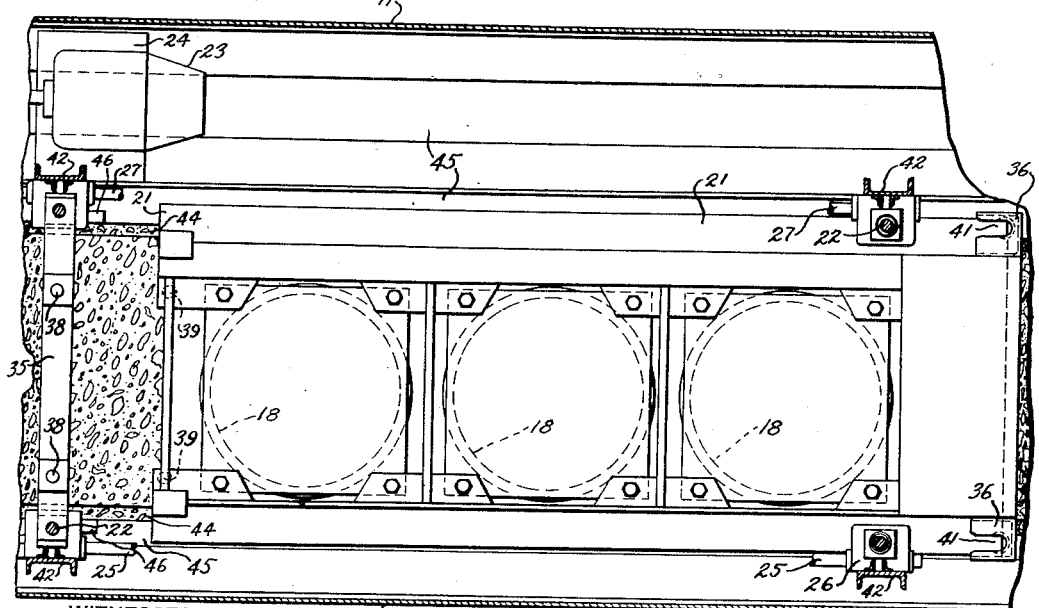
Fig. 4 is a view, in plan, of the structure shown in Fig. 3.

In order that the circuit breaker unit may be raised to the position shown in Figs. 1 and 2, in which the fixed contacts 15 are engaged by the contacts 16, and lowered to the position shown in Figs. 3 and 4, in which the unit may be removed from the cell by means of a transport truck 21, a motor driven screw 22 is provided at each corner of the housing 10.

The screws 22 are driven by a motor 23 mounted on a suitable support 24 at the rear of the housing 10. The two screws at one side of the housing are driven by a shaft 25 which is connected to the lower ends of the screws through suitable gearing mechanisms 26, and the two screws at the other side of the housing are driven by a similar shaft 27. The two shafts 25 and 27 are driven in unison by the motor 23 through a continuous chain 28 which encircles sprocket wheels 31 and 32 on the shafts 25 and 27, respectively, and a sprocket 33 on the armature shaft of the motor 23. In this manner, all four screws 22 are driven at the same speed which ensures that the breaker unit will be maintained in a level position while being raised and lowered. The upper ends of the screws 22 are supported by suitable bearings 34 disposed at the top of the housing 10.

In order that the breaker unit may be readily moved into and out of the housing 10 in a horizontal plane and raised and lowered in a vertical plane without removing any bolts or other fastening devices, the rear end of the breaker frame 19 is carried by a cross bar 35, disposed between the two rear screws, and the front end is supported by a pair of lugs 36, one of which is secured to each side of the breaker frame 19. The cross bar 35 is raised and lowered by nuts 37 which travel up and down the rear screws 22 when they are driven by the motor 23, and the lugs 36 are raised and lowered by similar nuts on the front screws. Two spaced dowel pins 38 are provided on top of the cross bar 35 to fit into holes 39 in the bottom of the breaker frame to maintain its alignment while being raised.

As shown in Figs. 3 and 4, the cross bar 35 remains in the housing when the breaker unit is removed from the housing but the lugs 36 are removed with the breaker frame since they are secured to the frame. The lugs 36 are provided with slots 41 for engaging the nuts 37 on the front screws 22. The slots 41 are open at the rear to permit the breaker unit to be withdrawn from the housing without interfering with the screws 22. The nuts 37 are prevented from turning on the screws 22 by channel guide members 42, vertically disposed in the housing 10.

In order that the breaker unit may be lowered directly on the transport truck 21, the truck is so constructed that it can be run into the housing 10 underneath the elevating mechanism. The truck is provided with flanged wheels 43 which run in grooves 44 in the floor of the housing. A metal plate 45 may be provided at one side of each of the grooves 44 to constitute rails for the wheels 43.

It will be seen that the breaker unit may be removed from the housing by operating the motor 23 in the usual manner to lower the nuts 37 on the screws 22 until the breaker tanks 18 are resting upon the truck 21. The nuts 37 should be lowered sufficiently to disengage the dowel pins 38, on the cross bar 35, from the holes 39 in the bottom of the breaker frame 19 and also to disengage the front nuts 37 from the lugs 36 on the side of the frame 19. The breaker unit can then be withdrawn from the housing on the truck 21 without interfering with the screws 22 since the lugs 36 are open at the rear, as previously described, and the cross bar 35 remains in the housing between the two rear screws 22.

Likewise, the unit can be inserted into the housing by moving the truck into the cell until its wheels strike stop members 46 disposed on the plates 45, in which position the holes 39 are over the dowel pins 38 and the lugs 36 are over the front nuts 37. When the breaker unit is in the correct position, the motor 23 may be operated in a direction to raise the nuts 37, thereby elevating the breaker until the contacts 15 are engaged by the contacts 16. The operation of the motor 23 may be controlled in any suitable manner, as by control switches which may be located at any convenient place.

However, it is desirable to provide a limit switch 47 to stop the motor when the breaker unit is raised to the correct position at the top of the housing, thereby preventing injury to the elevating mechanism. As shown, the limit switch 47 may be so disposed in the housing that it is operated by one of the nuts 37 to stop the motor when the breaker is at the proper elevation.

It will be noted that breakage of the chain 28 will merely cause the breaker unit to stop without injury to the breaker or the elevating mechanism since all four elevating screws will be stopped simultaneously. However, if separate chains were used to drive different screws, the stopping of part of the screws while the others remained in operation would result in injury to either the breaker unit or the elevating mechanism, or both.

From the foregoing description, it is apparent that I have provided a simple and efficient elevating mechanism for circuit breaker apparatus which permits the apparatus to be withdrawn from an enclosed cell structure without removing any bolts or other fastening devices. Furthermore, the possibility of injury to the apparatus or the elevating mechanism by a failure of a part of the equipment is minimized.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. Switchgear apparatus comprising a cell structure, a circuit breaker unit movable into and out of the cell in a horizontal plane, a plurality of screws disposed within the cell for raising and lowering the breaker unit in a vertical plane, gearing mechanisms for driving said screws, a motor for driving the gearing mechanisms, and a continuous chain for connecting the motor to said gearing mechanisms, whereby all of said screws are driven at the same speed through said chain.

2. Switchgear apparatus comprising a cell structure, a circuit breaker unit movable into and out of the cell in a horizontal plane, a plurality of screws disposed within the cell for raising and lowering the breaker unit in a vertical plane, a pair of horizontally disposed shafts for driving said screws, a motor for driving said shafts, and a continuous chain for connecting the motor to both of said shafts, whereby all of said screws are driven at the same speed through said chain.

3. Switchgear apparatus comprising a rectangular cell structure, a circuit breaker unit movable into and out of the cell in a horizontal plane, a screw disposed at each corner of the cell for raising and lowering the breaker unit in a vertical plane, a shaft disposed at each side of the cell for driving tht screws on the side on which the shaft is located, a motor for driving said shafts, and a continuous chain for connecting the motor to both of said shafts, whereby all of said screws are driven at the same speed through said chain.

4. Switchgear apparatus comprising a rectangular cell structure, a circuit breaker unit movable into and out of the cell in a horizontal plane, a screw disposed at each corner of the cell for raising and lowering the breaker unit in a vertical plane, means for driving said screws at the same speed, means carried by and connecting the screws at the rear of the cell for supporting the rear end of the breaker unit, and slotted means secured to the breaker unit and cooperating with the screws at the front of the cell for supporting the front end of the breaker unit.

5. Switchgear apparatus comprising a rectangular cell structure, a circuit breaker unit movable into and out of the cell in a horizontal plane, a screw disposed at each corner of the cell for raising and lowering the breaker unit in a vertical plane, means for driving said screws at the same speed, means horizontally extending between the screws at the rear of the cell and carried thereby for supporting the rear end of the breaker unit, and slotted means secured to the sides of the breaker unit and cooperating with the screws at the front of the cell for supporting the front end of the breaker unit.

6. Switchgear apparatus comprising a rectangular cell structure, a circuit breaker unit movable into and out of the cell in a horizontal plane, a screw disposed at each corner of the cell for raising and lowering the breaker unit in a vertical plane, means for driving said screws at the same speed, means horizontally extending between the screws at the rear of the cell and carried thereby for supporting the rear end of the breaker unit, and means secured to the sides of the breaker unit and cooperating with the screws at the front of the cell for supporting the front end of the breaker unit, said last named means having slots disposed therein for receiving said screws, said slots being open at the rear to permit the breaker unit to be withdrawn from the cell.

7. Switchgear apparatus comprising a rectangular cell structure, a circuit breaker unit movable into and out of the cell in a horizontal plane, a screw disposed at each corner of the cell for raising and lowering the breaker unit in a vertical plane, means for driving said screws at the same speed, a cross bar disposed between the screws at the rear of the cell for supporting the rear end of the breaker unit, a nut disposed on each of said rear screws for raising and lowering the cross bar, a lug secured to each side of the breaker unit, and a nut disposed on each of said front screws for engaging one of said lugs to raise and lower the front end of the breaker unit, said lugs having slots therein for receiving said front screws, said slots being open at the rear to permit the breaker unit to be withdrawn from the cell.

8. Switchgear apparatus comprising a rectangular cell structure, a circuit breaker unit movable into and out of the cell in a horizontal plane, a screw disposed at each corner of the cell for raising and lowering the breaker unit in a vertical plane, means for driving said screws at the same speed, a cross bar disposed between the screws at the rear of the cell for supporting the rear end of the breaker unit, means on the cross bar for engaging the breaker unit, a nut disposed on each of said rear screws for raising and lowering the cross bar, a lug secured to each side of the breaker unit, a nut disposed on each of said front screws for engaging one of said lugs to raise and lower the front end of the breaker unit, said lugs having slots therein for receiving said front screws, said slots being open at the rear to permit the breaker unit to be withdrawn from the cell, and guide means disposed in the cell to prevent said nuts from turning on said screws.

HAROLD H. RUGG.